United States Patent [19]
Veenhof

[11] Patent Number: 5,310,042
[45] Date of Patent: May 10, 1994

[54] CONVEYOR BELT STRIPPER

[75] Inventor: Willem D. Veenhof, El Cajon, Calif.

[73] Assignee: Martin Engineering Company, Neponset, Ill.

[21] Appl. No.: 75,049

[22] Filed: Jun. 10, 1993

Related U.S. Application Data

[63] Continuation of Ser. No. 761,287, Sep. 17, 1991, abandoned.

[51] Int. Cl.$^5$ ............................................. B65G 45/00
[52] U.S. Cl. ..................................... 198/497; 198/499
[58] Field of Search ................ 198/497, 499; 15/256.5, 15/256.51

[56] References Cited

U.S. PATENT DOCUMENTS

| | | | |
|---|---|---|---|
| 4,349,098 | 9/1982 | Veenhof | 198/497 |
| 4,498,577 | 2/1985 | Veenhof | 198/499 |
| 4,541,523 | 9/1985 | Stockton | 198/499 |
| 4,639,967 | 2/1987 | Bordignon | 15/256.5 |
| 4,662,507 | 5/1987 | Veenhof | 198/499 |
| 4,703,845 | 11/1987 | Veenhof | 198/499 |
| 4,779,716 | 10/1988 | Gordon | 198/497 |
| 4,821,867 | 4/1989 | Veenhof | 198/499 |
| 4,838,409 | 6/1989 | Rappen | 198/497 |
| 4,850,474 | 7/1989 | Schwarze | 15/256.5 X |
| 4,962,845 | 10/1990 | Gibbs | 198/499 |
| 5,014,844 | 5/1991 | Antlonen | 198/499 |
| 5,031,750 | 7/1991 | Barnes | 198/497 X |

FOREIGN PATENT DOCUMENTS

| | | | |
|---|---|---|---|
| 0094021 | 11/1983 | European Pat. Off. | |
| 2318497 | 11/1973 | Fed. Rep. of Germany | |
| 3831033 | 3/1989 | Fed. Rep. of Germany | |
| 0106710 | 6/1985 | Japan | 198/497 |
| 1410430 | 10/1975 | United Kingdom | |
| 2165809 | 4/1986 | United Kingdom | |
| 2221440 | 2/1990 | United Kingdom | 198/497 |
| 2227991 | 8/1990 | United Kingdom | |

OTHER PUBLICATIONS

Advertisement, "Durt Tracker", by Martin Engineering Company of Neponset, Ill.; copyright notice date 1986.

Primary Examiner—Robert P. Olszewski
Assistant Examiner—Tuan N. Nguyen
Attorney, Agent, or Firm—Lee, Mann, Smith, McWilliams, Sweeney & Ohlson

[57] ABSTRACT

A conveyor belt cleaning assembly includes an array of stripper blocks which are coupled to a rigid crossbar by resilient connecting arms. The resilient connecting arms are characterized by high compressive strength, but exhibit a structural collapsing response to off center deflection forces which exceed a predetermined load level. The collapsed connecting arms thus provide a reduction in length of the stripper assembly in response to a belt reversing condition. One side of each connecting arm has the ability to collapse in response to a relatively low deflection force and the other side has the ability to deflect and withstand substantial compression loading without collapse. In the preferred embodiment, the connecting arms are constructed of a resilient material, such as polyurethane, with the body of each connecting arm being intersected by a large aperture, thereby defining a forward collapsible wall and a load bearing rear wall. A reduction in length of the entire connecting arm is achieved by collapsing the forward wall in response to the loading imposed by engagement of the stripper block against a reverse moving conveyor belt.

26 Claims, 4 Drawing Sheets

CONVEYOR BELT STRIPPER

CROSS REFERENCE TO RELATED APPLICATION

This is a continuation of application Ser. No. 07/761,287 filed Sep. 17, 1991, now abandoned.

FIELD OF THE INVENTION

This invention relates to cleaning or scraping devices utilized for removing material which adheres to a conveyor belt or pulley drum.

BACKGROUND OF THE INVENTION

In the operation of bulk material conveyors, a belt scraper assembly is provided for removing adherent material from the conveyor belt and depositing it into a discharge area. In the absence of a cleaning device, or as a result of a poorly functioning belt scraper, carry-over spillage material will be accumulated beneath the conveyor belt. In addition to constituting a nuisance, a large amount of valuable product will be deposited beneath the conveyor and may build up sufficiently to interfere with operation of the conveyor. For example, a volume of spillage material 1/16 inch (1.6 mm) deep and 1 inch (25 mm) wide will produce approximately 2½ cubic feet (0.075 cubic meters) of carry-over per 100 feet per minute (0.48 meters per second) of belt speed each hour. At a conveyor speed of 500 feet per minute (2.5 meters per second), this small stream produces approximately 10 tonnes of carry-over spillage every eight hours, based on a density of 100 pounds per cubic foot (1500 kg/cubic meter).

Consequently, there is considerable interest in improving the operation and efficiency of conveyor belt cleaning devices.

2. Description of the Prior Art

Conventional conveyor belt cleaning devices generally include one or more blades disposed in a plane transverse to the conveyor belt and are urged toward the belt so as to cause engagement of an edge of the blade against the belt surface. Such conveyor belt cleaning devices must be located rearwardly of the head pulley drum on the return path of the conveyor belt so that sufficient flexibility in the belt is provided to permit transverse movement thereof when protruding objects pass the cleaning device. The belt cleaning device is hampered constantly by obstructions such as mechanical fasteners moving at high speeds, which are often driven by hundreds of horsepower.

One of the major causes of failures in conveyor belt cleaning equipment is reverse operation of the conveyor belt. If the belt reverses, the reverse movement of the belt can drive the blades into the belt and cause tearing of the belt and damage to the scraper. This problem occurs frequently on inclined conveyors where the hold back allows the belt to reverse a few inches before locking. It also occurs when a traveling tripper is moved forward when the belt is stopped. A reversing belt condition can occur in the operation of reversible conveyors, single direction conveyors having a "traveling tripper", with the belt reversing over the pulley if the tripper is moved forward while the belt is stopped, and in the operation of single direction conveyors having a telescoping discharge section.

A common situation in which belt damage occurs frequently is in an inclined conveyor which is shut down with a load on the belt. The load tends to pull the conveyor in a reverse direction, sliding downhill. To prevent the belt from running away downhill with a load on it, a device called a "hold-back" is incorporated either onto the shaft that drives the pulley or within the gearing. The hold-back device does not operate with 100% efficiency, and it is common for the belt to creep backward. A very short distance of creep back or roll back, for example, ⅛ inch of roll back, is sufficient to impose tremendous loads on the scraper blades since the scraper is usually working at an angle the belt. Such compression loads will damage the weakest link first, with the weakest link usually being the belt scraper. If the belt scraper is solid and strong enough, it will cause tearing damage to the conveyor belt. Because of this condition, most belt scrapers are designed to engage an unsupported section of the belt after it has left the pulley. In such arrangements, the belt does not have a solid backing, and the belt itself can lift, thereby relieving the forces that would be imposed on the scraper in response to a reversing condition.

Various improved belt scrapers have been proposed or are now in use for engagement against a supported section of the conveyor belt, for example, see U.S. Pat. Nos. 4,349,098; 4,498,577; 4,662,507; and 4,821,867 by Willem Dirk Veenhof. According to those arrangements, a flexible belt scraper assembly is positioned beneath the overhang defined by the discharge pulley drum. The foregoing flexible scraper assemblies have proven effective and efficient in cleaning conveyor belt surfaces in a wide variety of applications. However, severe tension loads may be induced within the flexible scraper strands under certain load conditions which can cause accelerated wear of scraper components and failure.

Some of the means that have been used or are presently being used to permit yieldable engagement of a flexible scraper against the conveyor belt in the pulley drum overhang region is a mounting frame which is counterweighted or spring-loaded to apply yieldable pressure against the belt. Extensive testing and operational experience have shown that the counterweight and spring bias arrangements are subject to damage from the reaction forces transmitted to the support assembly which tend to cause its destruction, and the scraper itself may damage the conveyor belt during reverse operation.

Consequently, there is considerable interest in providing a belt scraper which can operate effectively and efficiently against a drum supported conveyor belt, and which includes means for automatically yielding to prevent damage to the scraper or to the conveyor belt in response to a reversing condition.

It has been determined that the ideal scraper location for maximum efficiency is beneath the overhang defined by the discharge pulley drum, with the scraper engaging the conveyor belt surface which is supported by the face of the pulley drum. Moreover, because of mounting space limitations and the potential for accumulation of load material on exposed scraper components, it is desirable to have the scraper mounting framework rigidly mounted on the pulley drum support frame, with the exposed structure of the scraper assembly being supported beneath the overhang of the pulley drum to minimize exposure to discharged load material. Since the conveyor belt itself is rigidly fit into contact against the cylindrical face of the pulley drum at the point at which scraping and cleaning occur, it is essential that the scraper be modified to enable it to accept a reversing condition without causing damage to the conveyor belt, the scraper itself or its supporting structure.

SUMMARY OF THE INVENTION

In keeping with the constraint that the scraper support structure should be rigidly attached to the pulley drum frame and that the belt itself should be supported against deflection by the cylindrical face of the pulley drum at the point of scraping engagement, and in order to avoid damage during reverse travel of the conveyor belt, the scraper mechanism itself must be able to shorten its length or collapse in response to a reversing condition, since the belt cannot move away and the scraper frame cannot move away. During forward travel of the conveyor belt, the scraper blade must be positioned transversely to the conveyor belt surface at an appropriate scraping angle for efficient cleaning and scraping action to occur. Moreover, it is desirable to automatically feed the scraper element against the conveyor belt so that the body of the scraper element is advanced into scraping engagement as the leading edge of the scraper wears away, thereby avoiding frequent scraper adjustments which would cause excessive downtime.

The foregoing conditions are satisfied according to the present invention by a scraper assembly in which an array of scraper blocks are coupled to a rigid crossbar by resilient connecting arms which are characterized by high compressive strength, but which exhibit a structural collapsing response to deflection forces, thereby providing a reduction in length of the connecting arm in response to a belt reversing condition. This provides the connecting arm the ability to collapse in response to a relatively low deflection force. In the preferred embodiment, each deflection arm is constructed of a resilient material, such as polyurethane, with the body of the connecting arm being intersected by a large aperture, thereby defining a forward collapsible wall. A reduction in length of the entire connecting arm is achieved simply by collapsing the forward wall in response to the loading imposed by engagement of the stripper block against a reverse moving conveyor belt.

During operation of the conveyor belt in the forward direction of travel, the rear wall of the connecting arm is in compression and permits the scraper head to deflect through an arc which is substantially tangent to the belt surface at the point of engagement. Because of the resilient character of the connecting arm material, a constant bias force is applied to the scraper block which maintains a predetermined level of yieldable, scraper loading against the conveyor belt surface, while constantly moving the scraper block into engagement with the belt surface as its leading scraper edge wears away. Although the scraper block is constructed of a sacrificial material which wears away during use, the body of the scraper block is constantly being advanced into engagement with the conveyor belt through an arc which is substantially tangent to the point of engagement, thereby maintaining an effective scraping surface throughout the lifetime of the scraper block. Consequently, manual adjustment of scraper block position is not required.

Because the scraper block is a sacrificial component, and because it is advanced through an arc into engagement with the conveyor belt, substantially the entire body of the scraper block is available to replace the worn off material during its lifetime. The energy stored in the compressed connecting arm provides the driving force for constantly advancing the scraper block into scraping engagement with the conveyor belt. Because the scraper block is advanced through an arc at a shallow angle which is almost parallel with the belt at the point of engagement, rather than being applied along a line perpendicular to the conveyor belt at the point of engagement as in conventional belt scrapers, the component of force transmitted to the scraper block and its supporting structure is substantially reduced, thereby reducing the magnitude of load forces which are absorbed by the supporting structure. The net result is that the wear to the scraper block and to the scraper support assembly is reduced because the reaction forces absorbed by those structures are reduced.

Another advantage provided by the foregoing scraper assembly is that the scraper block, because of its low angle approach to the point of engagement, deflects the material from the conveyor belt by stripping or peeling the adherent material by breaking its adhesion, separating it from the belt and then allowing it to continue along its natural trajectory, with the result that the material is deflected through a small angle, substantially less than 90 degrees. That is, the scraper block peels away the adherent load material substantially without altering its direction of natural flow while absorbing only a fraction of the energy of the deflected material. This allows the use of a lower preload scraping force as compared with conventional scrapers which must be constructed to withstand the full force or material deflected by as much as 90 degrees from the natural trajectory.

The scraper blade of the present invention is preloaded with enough force to break the adhesion between the adherent load material and the conveyor belt and peel it away. Other scrapers must preload their blade with sufficient force to break the adhesion plus withstand the impact of the material as it separates from the conveyor belt and is deflected away. In the present invention, the life of the stripper block and the life of its supporting assembly is extended since the magnitude of absorbed reaction forces is reduced and there are less wear forces absorbed by the supporting structure. Moreover, the accelerated wear sustained by all conveyor belt scrapers when the belt is clean and dry is reduced, compared to conventional scraper assemblies, because the stripper block is preloaded only to the level required to peel away the adherent load material, which is considerably less than the preloading of conventional scraper blades which must absorb the full impact of the adherent material as it separates from the conveyor belt.

Other features and advantages of the present invention will be appreciated by those skilled in the art upon reading the detailed description which follows with reference to the attached drawings.

BRIEF DESCRIPTION OF THE DRAWINGS

FIG. 8 is a view similar to FIG. 6 which illustrates forward deflection and engagement of a preloaded connecting arm constructed according to a first alternative embodiment in response to forward travel of the conveyor belt;

FIG. 9 is a view similar to FIG. 7 which illustrates reverse deflection and collapse of the connecting arm of the first alternative embodiment in response to reverse travel of the conveyor belt;

FIG. 10 is a view similar to FIG. 6 which illustrates forward deflection and biased engagement of a connecting arm constructed according to a second alternative embodiment in response to forward travel of the conveyor belt; and, FIG. 11 is a view similar to FIG. 7 which illustrates reverse deflection and collapse of the second alternative embodiment connecting arm in response to reverse travel of the conveyor belt.

DETAILED DESCRIPTION OF THE PREFERRED EMBODIMENTS

In the description which follows, like parts are indicated throughout the specification and drawings with the same reference numerals, respectively. The drawings are not necessarily to scale, and the proportions of certain parts have been exaggerated to better illustrate details of the present invention.

Figure 1:
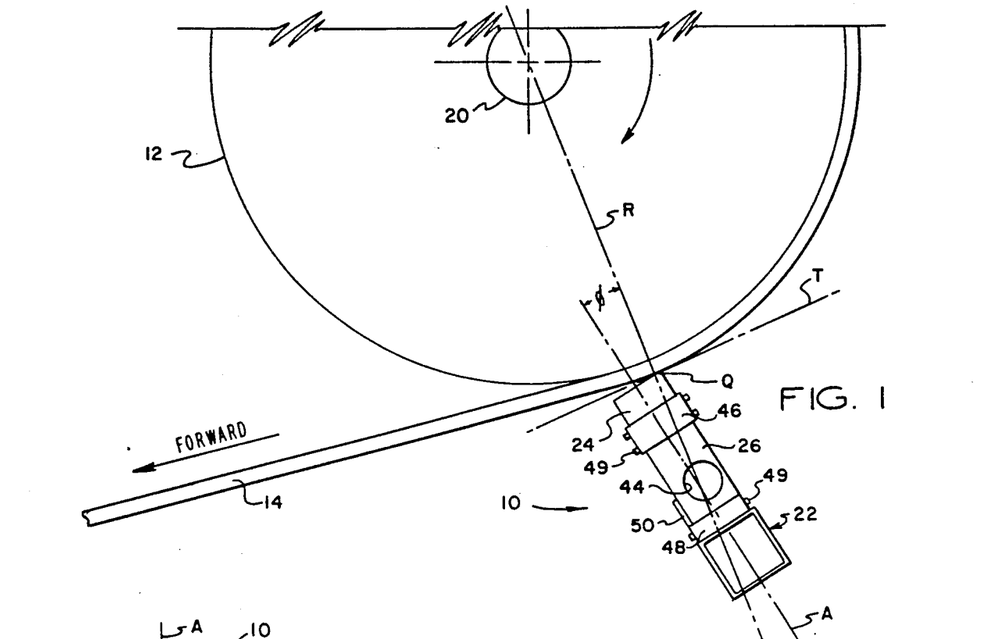
FIG. 1 is a side elevational view of a conveyor belt assembly illustrating one embodiment of a conveyor belt cleaning device in operation.
Figure 2:
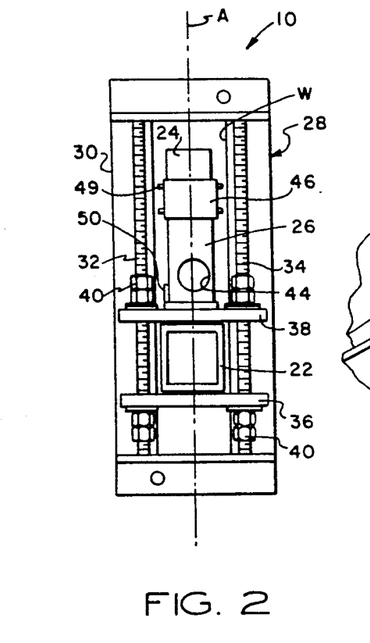
FIG. 2 is a side elevational view of the same conveyor belt cleaning device, together with its mounting hardware.
Figure 3:
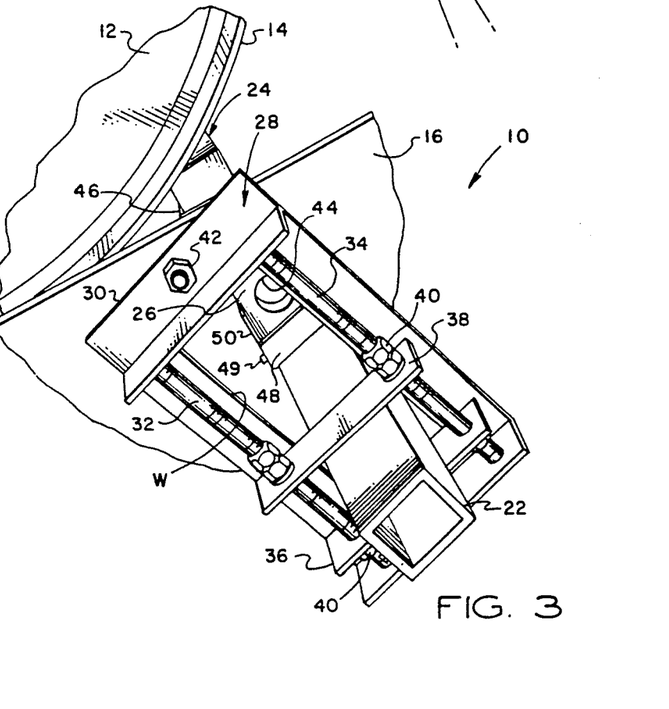
FIG. 3 is a perspective view, partially broken away, showing the installation of the conveyor belt cleaning device and its support structure.

Referring now to FIG. 1, FIG. 2 and FIG. 3, a conveyor belt cleaning assembly 10 is located beneath the overhang of a head pulley drum 12 which supports a conveyor belt 14 passing therearound. The conveyor belt 14 is an endless flexible belt operating over drive, tail-end and bend pulleys, and over belt idlers or slider beds. The conveyor belt 14 is suitable for handling a variety of materials, for example, wood products, coal, ash, sand and gravel, iron ore, cement, sludge and garbage, in a wide range of particle sizes over long distances, up and down slopes.

Figure 5:
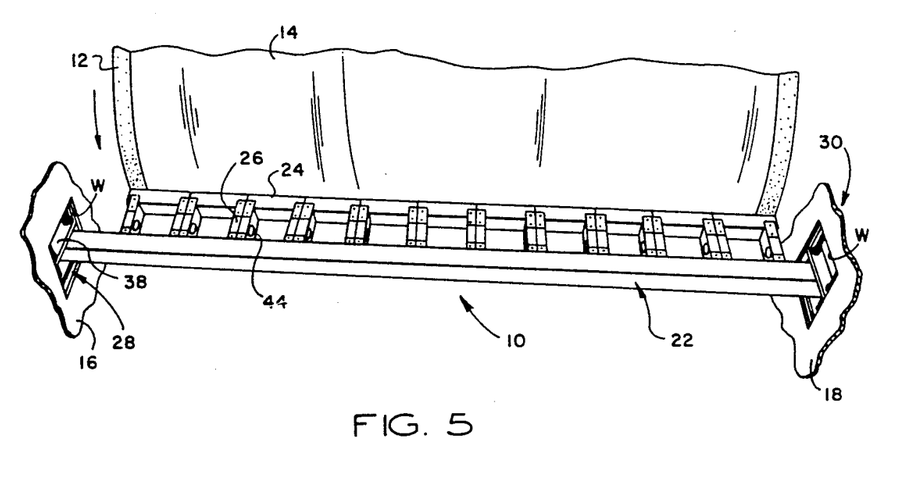
FIG. 5 is a front perspective view showing engagement of the conveyor belt cleaning assembly against the conveyor belt in the overhang region of a pulley drum.

The supporting framework and structure for the head pulley drum 12 as well as for the conveyor belt cleaning assembly 10 is indicated generally in FIG. 3 and FIG. 5 as side frame members 16, 18. It will be understood that the head pulley drum 12 is mounted on a shaft 20 which is mounted at opposite ends for rotation on bearings supported on the side frame members 16, 18, respectively.

The scraper assembly 10 includes a rectangular crossbar 22 and a plurality of scraper blocks 24 which are coupled to the crossbar 22 by a yieldable, collapsible connecting arm 26. As can best be seen in FIG. 5, rectangular openings are formed in the side frames 16, 18 for receiving the opposite projecting end portions of the rectangular crossbar 22. The transversely extending crossbar 22 is secured to the side frame 16, 18 by screw clamps 28, 30, respectively.

Referring again to FIG. 2 and FIG. 3, the screw clamp assembly 28 includes a rectangular frame 30 mounted on the side frame 16 on which a pair of threaded rods 32, 34 are secured in offset, parallel spaced relation. One end portion of the rectangular crossbar 22 projects through a rectangular window opening W formed in the frame 30. The crossbar 22 is secured between clamp plates 36, 38 which maintain the tubular crossbar 22 in compression engagement as a result of torque applied to tightening nuts 40. The opposite end portion of the crossbar 22 is likewise supported by an identical clamp assembly 28 mounted on the opposite side frame 18. The tubular crossbar 22 is initially positioned to impose a predetermined level of preloading compression of the scraper blocks 24 against the surface of the belt 14 as illustrated generally in FIG. 1.

The line of engagement of the scraper block 24 edge against the conveyor belt surface is indicated generally by the point Q, the location of which is defined by the intersection of the belt radius R and the tangent line T. However, it will be understood that in practice, the engagement between the scraper block 24 and the conveyor belt 14 is manifested by surface engagement as the scraper block 24 wears away. According to the preferred embodiment, the longitudinal axis A of the scraper assembly 10 is offset by an angle $\phi$ with respect to the radius line R. The angle $\phi$ is preferably about 10 degrees to 20 degrees for most efficient stripping action.

Preferably, the tubular crossbar 22, together with the conveyor belt stripper assembly 10, is located inwardly of the overhang portion of the head pulley drum 12 so that conveyed material, and in particular lumps thereof, will not become wedged between the belt surface and the crossbar 22 when traveling along the discharge path. The crossbar 22 is located substantially below the axis of rotation of the head pulley drum 12 and is spaced evenly away from the belt surface itself. The crossbar 22 is stabilized at each end by the screw clamp assemblies 28, 30 which are rigidly attached to the side frames 16, 18 by threaded bolt fasteners 42. According to this arrangement, the scraper assembly 10 is rigidly mounted onto the conveyor frame structure, with its orientation relative to the curved surface of the conveyor belt in the overhang region being fixed, thereby establishing a desired level of preload compression in the collapsible connecting arms 26 as the scraper blocks 24 are forced against the conveyor belt.

Figure 4:
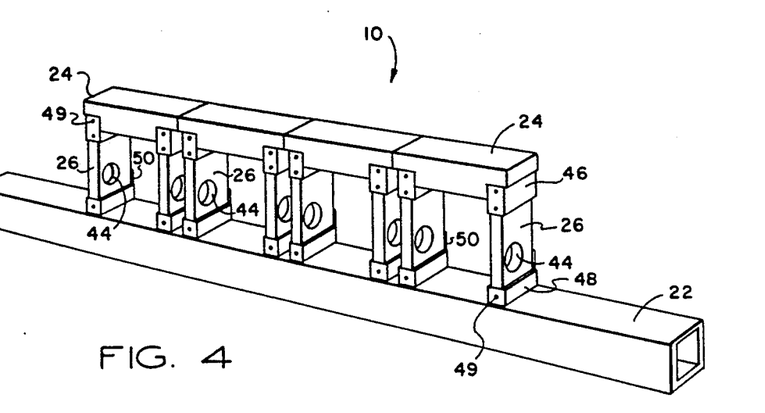
FIG. 4 is a perspective view of the conveyor belt cleaning device of FIG. 1.

Referring now to FIGS. 4 and 5, resilient stripping action is provided by the scraper blocks 24 which are yieldably coupled to the tubular crossbar 22 by the resilient, collapsible connecting arms 26. The purpose of the large aperture 44 in the connecting arm 26 is to enable the connecting arm to accept a reversing condition by collapsing in response to a predetermined level of deflection force.

Figure 6:
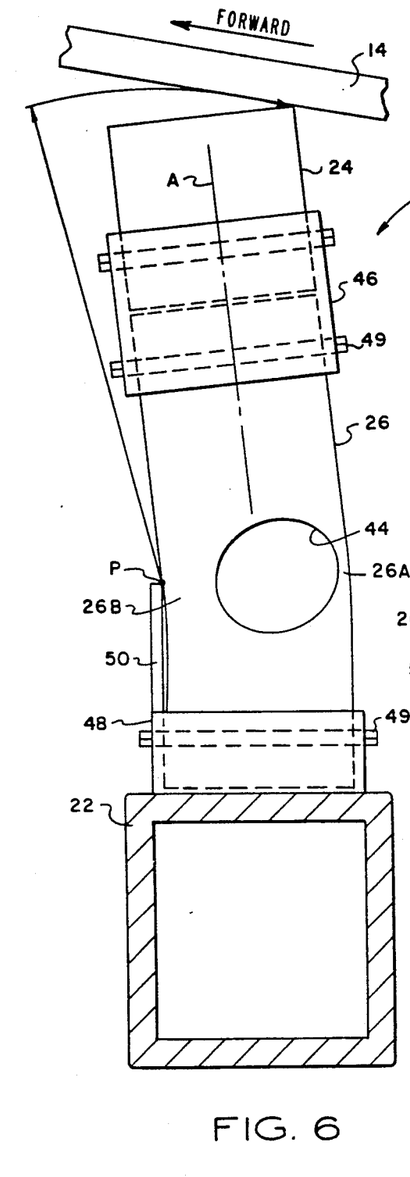
FIG. 6 is a side elevational view, partially in section and partially broken away, which illustrates forward deflection and biased engagement of a preloaded connecting arm during forward travel of the conveyor belt.
Figure 7:
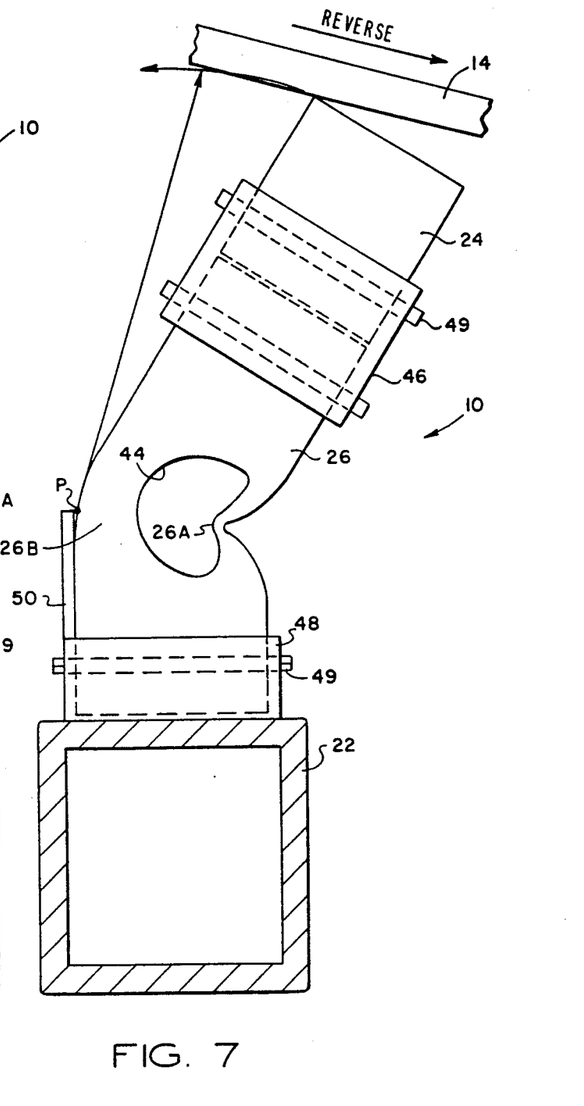
FIG. 7 is a view similar to FIG. 6 which illustrates reverse deflection and collapse of the connecting arm during reverse travel of the conveyor belt.

Referring to FIG. 4, FIG. 6 and FIG. 7, the aperture 44 is preferably a circular aperture which is located off center of the longitudinal axis A of the connecting arm 26. The large aperture 44 extends completely through the connecting arm 26, thereby defining a forward segment or wall member 26A and a rear segment or wall member 26B. The rear segment or wall member 26B is relatively thick, and is able to sustain preload compression without collapse. The front segment or wall member 26A, on the other hand, is relatively thin, and buckles or collapses inwardly in response to compression forces applied during reverse movement of the conveyor belt 14. As a result of the compression force applied to the rear wall member 26B and the deflection of the connecting arm 26, a bias force is applied through the stripper block 24 against the surface of the conveyor belt 14. During reversing movement, on the other hand, because of the inward collapse of the front wall member 26A, the compression forces are relieved and substantially decoupled with respect to the reverse moving conveyor belt 14.

In this embodiment, the connecting arm is rigidly attached to the crossbar 22 by the connector 48. The connector 48 includes a connecting pin 49 which extends completely through the lower end of the connecting arm 26. Since the lower end of the connecting arm 26 is fixed in place by the connector 48 and connector pin 49, the forward segment or wall member 26A elongates and stretches slightly in response to the frictional drag force imposed on the stripper block 24 by the forwardly moving conveyor belt 14. At the same time, the rear segment or wall member 26B is undergoing deflection about the pivot point P, with the result that the circular aperture 44 becomes distorted. Preferably, the connecting arm 26 is constructed of a polyurethane material which has a compressive strength of about 30,000 psi, and which stretches in response to tension loading at a much lower level than that at which it compresses.

In response to reverse motion of the conveyor belt 14, the forward wall member 26A collapses inwardly within the aperture 44, thereby achieving a reduction in the length of the scraper member to permit the scraper block 24 to deflect downwardly and thereby avoid a seizure condition. The resilient connecting arm 26 needs to be able to shorten its length because the belt 14 is supported against lifting motion by the underlying head pulley drum cylindrical surface, and the tubular support bar 22 cannot move away because it is rigidly attached to the conveyor side frame support structure. That is, the aperture 44 in the resilient connecting arm 26 permits it to collapse or buckle inwardly in response to a relatively low deflection force.

When the connecting arm 26 is constructed of polyurethane, it has a compressive strength of about 30,000 psi, but is able to deflect and collapse in response to a force of roughly 20 pounds applied to such connecting arm by the belt. If the aperture 44 was not present in the connecting arm 26, then a load of more than 30,000 pounds per connecting arm would be imposed on the tubular crossbar 22. In the present example, the belt is 72 inches wide, and the stripper assembly 10 includes twelve scraper blocks and twenty-four connecting arms 22. Consequently, the tubular support crossbar 22 would be subjected to a damaging loading in excess of 700,000 pounds. By forming the connecting arms 26 with the aperture 44, the loading imposed by the reverse motion of the conveyor belt is substantially decoupled from the stripper block 24, and limited to only about 40 pounds per block.

It will be appreciated that because of the decoupling effect of the collapsing wall, the conveyor belt load is only nominally changed by increasing the upward thrust to the block. Instead, the loading effect on the belt can be adjusted by selecting an increased hardness of the material for the resilient connecting arm 26, or by changing the diameter and/or location of the aperture 44 relative to the longitudinal centerline A of the connecting arm 26. In the preferred embodiment, the aperture 44 is located off center, thereby producing a rear wall member 26B which is thicker than the forward wall member 26A. The differential wall thickness permits the forward wall member 26A to collapse inwardly into the aperture 44 during reversing belt operation, and permits the rear wall member 26B to sustain compression loading and deflection during forward belt travel.

Preferably, the stripper block 24 is made of a durable, wear resistant material such as stainless steel, tungsten carbide or polyurethane. The stripper block 24 is mechanically connected to the distal end of the connecting arm 26 by a clamp 46. Likewise, the lower end of the connecting arm 26 is attached to the tubular crossbar 22 by a clamp 48. However, the connecting arm and stripper block may be integrally formed of the same material, if desired.

Referring again to FIG. 6 and FIG. 7, the crossbar 22 is moved inwardly toward the conveyor belt until deflection of the stripper block 24 and collapse of the connecting arm 26 are achieved. In response to forward movement of the conveyor belt the connecting arm is deflected counterclockwise with the rear wall member 26B bending about the pivot axis P or collapsing about the pivot axis P. The location of the pivot axis P is established by the edge portion 50E of an upright fulcrum plate 50 which is attached to the lower clamp 48. By this arrangement, the stripper block 24 is caused to rotate through an arc which is substantially tangent to the point of contacting engagement with the belt 14.

During installation, the leading edge of the stripper block 24 is driven into contact with the belt which is supported against deflection by the cylindrical surface of the pulley drum 12. As the tubular crossbar 22 is further advanced toward the pulley drum, for example by an additional ¼ inch, the thin forward wall member 26A will collapse to allow shortening of the overall scraper length to that distance. The thin wall segment 26A of the connecting arm 26 collapses inwardly within the aperture 44 to accommodate the shortened distance between the tubular crossbar 22 and the belt surface. When the belt 14 starts in the forward direction of travel, it pulls the stripper block 24 in the counterclockwise direction to produce the compressed rear wall configuration of FIG. 6.

In this arrangement, the resilient connecting arm 26 serves as a dual mode spring which biases the stripper block for clockwise rotation into engagement with the conveyor belt 14 during the forward belt travel mode, and collapses during the reverse travel mode. The stripper block 24, even though it is constructed of a durable material such as stainless steel, tungsten carbide or polyurethane, is nevertheless sacrificial and wears away with use. However, the stripper block continues to be advanced into engagement with the conveyor belt 14 as the leading edge of the block wears away. Thus, the stripper assembly 10 is self-adjusting during use, thereby avoiding frequent manual adjustments which would require that the conveyor be shut down according to government (OSHA) regulations which specify that such adjustments can only be made when the belt is stationary.

The collapsible forward wall member 26A of the connecting arm 26 permits the connecting arm to shorten as it moves through its arc. The connecting arm also imposes the necessary bias force to achieve stripping. The body of the sacrificial material remains downstream from the belt, with the actual direction of rotational movement of the sacrificial edge being in an arc leading toward the belt in a direction opposite to the belt travel, and approaching tangentially to the point of engagement. The sacrificial material of the stripper block 24 which is being fed into the wear area is feeding in from a direction which is a few degrees off of parallel with the belt. The stripper block 24 automatically adjusts because it is biased forward in rotation as it wears away. It turns through a clockwise arc with an approach which is only about 10 to 20 degrees from parallel belt alignment. In conventional scrapers, the body of sacrificial material is fed in along a line which is perpendicular to the belt. Various bias means are required to maintain effective scraping engagement in such prior art bias arrangements.

A major problem in the operation of any scraper is that the forces imposed by the conveyor belt are absorbed within the scraper assembly. In the present stripper assembly 10 in which the stripper block 24 is advanced through an arc at a shallow angle which is almost parallel with the belt 14 at the point of engagement, rather than being applied along a line perpendicular to the conveyor belt, the component of force transmitted to the stripper block 24 and its supporting structure is substantially reduced. This in turn reduces the magnitude of load forces which are absorbed by the supporting structure. The net result is that the wear on the stripper block 24 and its support assembly is reduced because the reaction forces transmitted to those structures are reduced.

Because of its tangential approach to the point of belt engagement, the stripper block 24 separates the adherent material from the conveyor belt by stripping or peeling away the adherent material. That is, the stripper block 24 separates the adherent material from the belt 14 and then allows it to continue along its natural trajectory. It will be appreciated that the stripper block 24 can be made in the form of a thin blade when it is constructed of tungsten carbide or stainless steel. When the edge of a thin stripper blade 24 is brought in along an arc as shown in FIG. 6, it peels away the adherent material substantially without altering the direction of natural flow while absorbing only a fraction of the energy contained in the deflected material. This permits the use of a lower preload compression force in the stripper assembly 10 as compared with conventional scrapers which must be preloaded to withstand substantially the full force of the deflected material.

The stripper block 24 of the present invention is preloaded with the minimal force required to break the adhesion between the material and the conveyor belt 14 and peel it away. Consequently, the life of the stripper blade 24 and the life of its supporting assembly is extended since the magnitude of absorbed reaction forces is reduced along with a reduction in the wear forces absorbed by the supporting structure.

An important consideration in the operation of the present invention is that the load forces imposed on the stripper block 24 are limited to the preload scraping force which is imposed against the belt 14. In conventional scraper assemblies with counterweighting or spring loading, the preload forces are established when the belt 14 is stationary, and the scraper elements may be subjected to a loading of only about 5 pounds per inch. However, once the belt starts to move, the scraper elements are subjected to dynamic frictional forces which result in a total force which is substantially higher than the static preload force. In the operation of the scraper assembly 10 of the present invention, however, because the stripper block 24 and connecting arm 26 yield and rotate through an arc away from the point of engagement, the frictional forces are relieved immediately, and the net force of engagement does not exceed the preload level.

That is, the stripper block 24 of the present invention deflects and rotates along an arc substantially parallel with the direction of conveyor belt movement, and yields through rotational movement to maintain the preload drag level. The stripper block 24 truly floats in its engagement against the belt surface and yields automatically to maintain the desired preload level of stripping engagement. An extended life for the scraper assembly and its supporting structure is achieved since the reaction forces which are transmitted through the scraper block are substantially reduced by its tangential approach as compared to the right angle approach of the prior art belt scrapers.

Another distinction with respect to conventional conveyor belt strippers is that the stripper block 24 peels away the adherent material and causes it to flow along its natural trajectory rather than causing it to deflect by a full turn of about 90 degrees as in conventional scrapers. Because the scraping edge of the stripper block 24 is a relatively thin edge, it produces a bow wave in the adherent material which is being peeled away from the conveyor belt surface. The adherent material which is feeding up from behind is deflected by the bow wave and is not contacted by the blade. Instead of being turned at a right angle, it continues substantially along its natural trajectory as a result of its momentum and falls through the spaces between the connecting arms as shown in FIG. 5. Consequently, the adherent material is separated or peeled away from the belt surface, while being only slightly diverted from its natural trajectory. Once the load material has lost its adhesive contact with the belt, it will follow its natural trajectory and pass through the scraper assembly. In practice, there will be a small amount of accumulation within a triangular pocket area along the blade. Otherwise, the adherent material flows over the triangular region and follows substantially along its natural trajectory.

Moreover, the accelerated wear associated with running a belt clean and dry will be less in the scraper assembly 10 of the present invention because the preloading of the stripper block 24 is substantially less than the preloading of conventional scraper blades. Although accelerated wear will naturally occur when running clean and dry, it will be at a substantially reduced rate as compared with conventional belt scrapers.

Referring again to FIGS. 6 and 7, the aperture 44 is illustrated in the preferred embodiment as circular. However, other geometrical aperture configurations such as rectangular, diamond, D-shaped, triangular or elliptical may be used to good advantage. That is, the aperture opening 44 can assume various shapes as long as material is removed to define a front wall and a rear wall, or a separated front leg and rear leg.

Referring again to FIG. 4 and FIG. 6, the rear leg member 26B is reinforced by a back plate 50 which is rigidly attached to the connecting clamp 48. The back plate 50 constrains the connecting arm 26 to pivot about the point P, thereby relieving the stress loading induced within the connecting arm 26 by the pin 49.

Figures 8, 9, 10, 11:
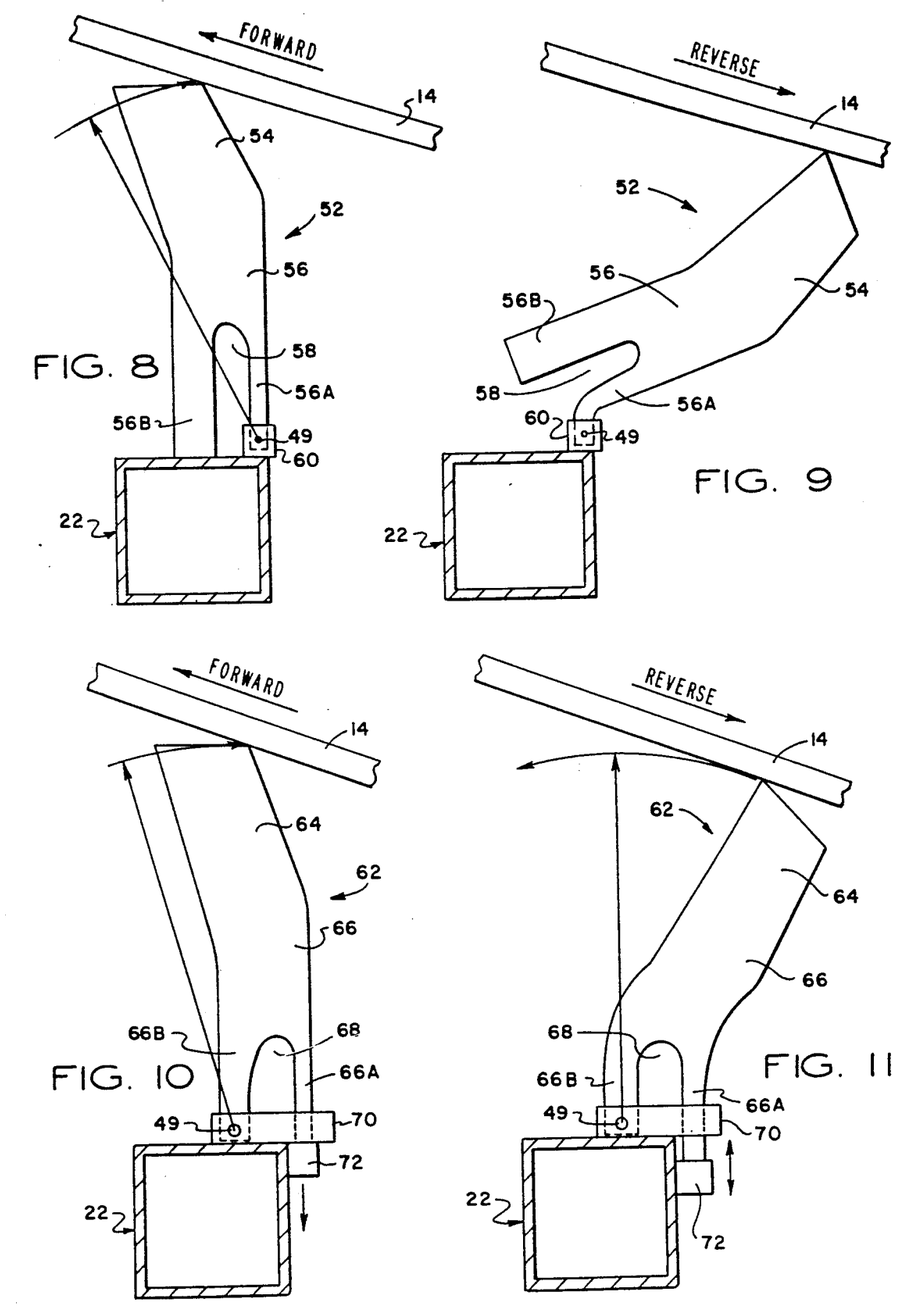

Referring now to FIG. 8 and FIG. 9, a first alternative embodiment of a stripper assembly 52 in which a stripper block 54 and a connecting arm 56 are integrally formed in a unitary block of resilient material, preferably polyurethane as discussed above. In this embodiment, the stripper block portion 54 is coupled to the tubular crossbar 22 by the resilient connecting arm portion 56. The connecting arm portion 56 has a forward wall member 56A and a rear wall member 56B which are separated by an elongated open slot 58. The lower end of the forward wall member 56A is attached to the tubular crossbar 22 by a pivot pin 49 and connector bracket 60.

According to this embodiment, the rear wall member 56B is free to rotate away from the tubular crossbar 22. During forward travel of the conveyor belt 14, the rear wall member 56B undergoes compression loading as a result of the preload compression forces produced by the close spacing of the tubular crossbar 22 relative to the conveyor belt 14. The stripper block 54 deflects in the forward belt travel direction (counterclockwise) in response to the preloading forces and frictional drag imposed by forward travel of the conveyor belt 14. Since the forward wall member 56A is pinned to the connector bracket 60, it sustains tension, which causes it to elongate slightly in response to the frictional loading imposed by the forwardly moving conveyor belt 14. The compression in the rear wall member 56B imposes a bias force through the stripper block 54 against the forwardly traveling conveyor belt 14.

In response to reverse travel of the conveyor belt 14, as shown in FIG. 9, the stripper assembly 52 rotates in the clockwise direction, with the rear connecting arm portion 56B lifting out of engagement with the tubular crossbar 22. At the same time, the forward wall member 56A bends as the stripper block 54 and connecting arm 56 deflect. By this arrangement, the preload forces are decoupled from the conveyor belt, so that a seizure condition cannot arise. Upon return of belt movement to the forward direction, the stripper assembly 52 is returned automatically to the forward biased position as shown in FIG. 8.

Referring now to FIG. 10 and FIG. 11, a second alternative embodiment is illustrated in which a stripper assembly 62 includes a stripper block 64 movably coupled to the tubular crossbar 22 by a resilient connecting arm 66. Preferably, the stripper block 64 and connecting arm 66 are formed of a unitary block of resilient material, for example, polyurethane. In this arrangement, the connecting arm 66 has a forward wall segment 66A and a rear wall segment 66B which are separated by an open slot 68. The rear wall segment 66B is attached to the tubular crossbar 22 by a connecting bracket 70 and a connecting pin 49. The connecting bracket 70 is welded onto the tubular crossbar 22, with a portion projecting laterally away from the crossbar 22 in a cantilever arrangement. The rear wall segment 66B is pivotally coupled to the tubular crossbar 22 by a pin 49 and the connector bracket 70. The forward connecting leg member 66A extends through a window opening formed in the connector bracket 70, and is terminated by an end block 72.

According to this embodiment, the end block 72 engages the underside of the connector bracket 70 and opposes vertical movement of the forward connecting arm member 66A during Operation in the forward belt travel mode as shown in FIG. 10. During such operation, the forward leg member 66A undergoes tension loading and stretches slightly in response to the tension forces induced by frictional drag of the stripper block 64 against the moving conveyor belt 14. At the same time, the rear leg member 66B undergoes compression loading and the stripper block portion 64 deflects counterclockwise slightly in response to the preload forces.

Upon the onset of a reverse travel condition as shown in FIG. 11, the stripper block 64 is rotated clockwise and is deflected in the reverse (clockwise) direction. The forward leg member 66A is displaced downwardly through the connector bracket 72 opening, thereby permitting the stripper assembly 62 to shorten its length, and avoid a seizure condition. At the same time, the rear leg undergoes bending deflection as the forward leg member 66A is extended downwardly through the bracket opening. Upon the resumption of conveyor belt travel in the forward direction, the stripper block 64 is rotated in the counterclockwise direction and automatically returns to its preload biased position as the end block 72 engages the underside of the connector bracket 70.

It will be understood that provision is made in each of the foregoing embodiments to permit the overall length of the connecting arm and scraper block assembly to become reduced automatically in response to a reversing condition, while maintaining compression loading and deflection engagement against the conveyor belt during forward travel of the conveyor belt. In each embodiment, an aperture or slot separates forward and rear leg members which are capable of independent movement with respect to each other, either by collapsing or differential displacement to permit the overall length of the scraper assembly to be shortened in response to a reversing condition. Moreover, the stripper block is yieldably urged into engagement with the conveyor belt along a path which approaches at a relatively shallow angle in a direction opposite to the belt movement. Consequently, the load forces transmitted to the stripper support structure are substantially reduced.

Another significant performance feature is that because of the substantially tangential approach of the stripper block into engagement with the conveyor belt, the adherent material is separated from the belt by breaking the force of adhesion along a line which is substantially tangent to the belt at the point of engagement, with the result that the adherent material is permitted to follow substantially along its natural trajectory path. By this arrangement, the stripper assembly need only be preloaded to a level to produce efficient separation of the material, substantially without absorbing the energy of the adherent material after it has been separated.

Although the invention has been described with reference to certain preferred embodiments, and with reference to a specific conveyor belt cleaning application, the foregoing description is not intended to be construed in a limiting sense. Various modifications of the disclosed embodiments as well as alternative applications of the invention will be suggested to persons skilled in the art. For example, the various embodiments of the present invention may be used to good advantage for cleaning the surface of a snubber pulley drum. Moreover, the various embodiments of the present invention may be set up for cleaning engagement against an unsupported section of the conveyor belt outside of the overhang region. It is therefore contemplated that the appended claims will cover any such modifications, embodiments and applications that fall within the true scope of the invention.

What is claimed is:

1. A scraper assembly for use in combination with a conveyor belt, said scraper assembly including:
   a crossbar member adapted to be mounted adjacent to the conveyor belt;

a scraper block supported by the crossbar member for engagement against the conveyor belt;

a deflectable connecting arm coupling the scraper block to the crossbar member, the connecting arm comprising a body of resilient material having a longitudinal axis, said body of resilient material being intersected by an aperture which extends transversely with respect to the longitudinal axis and which is located off center with respect to the longitudinal axis.

2. A scraper assembly as defined in claim 1, wherein the connecting arm is constructed of polyurethane.

3. A scraper assembly as defined in claim 1, wherein the scraper block is constructed of metal.

4. A scraper assembly as defined in claim 3, in which said metal comprises tungsten carbide.

5. A scraper assembly as defined in claim 1, in which the scraper block is constructed of polyurethane.

6. The scraper assembly of claim 1 wherein said scraper block is integrally attached to said connecting arm.

7. A belt scraper adapted to be mounted on a crossbar member of a conveyor belt cleaner for cleaning the surface of a conveyor belt, said belt scraper assembly including:

a scraper block adapted to be positioned for scraping engagement against an external surface portion of the conveyor belt; and, a deflectable connecting arm for coupling said scraper block to the crossbar member, said connecting arm comprising a body or resilient material having a longitudinal axis, said body of resilient material being intersected by an aperture which extends transversely with respect to said longitudinal axis and which is located off center with respect to said longitudinal axis.

8. A belt scraper assembly as defined in claim 7, wherein the scraper block is disposed substantially in longitudinal alignment with the connecting arm when the connecting arm is not deflected.

9. A belt scraper assembly as defined in claim 7, wherein first and second portions of the connecting arm body are separated by the aperture, with one connecting arm body portion being characterized by a collapsing response to compressive loading which exceeds a first predetermined level, and the other connecting arm body portion being capable of sustaining compressive loading without collapse at a second predetermined level which exceeds the first predetermined level.

10. A belt scraper assembly as defined in claim 7, wherein first and second portions of the connecting arm body are separated by the aperture, with one connecting arm body portion having a body thickness sufficient to sustain compressive loading at a predetermined magnitude without collapse, and the other connecting arm body portion having a body thickness which is not sufficient to sustain compressive loading at the same magnitude.

11. A belt scraper assembly as defined in claim 7, wherein first and second portions of the connecting arm body are separated by the aperture, with one connecting arm body portion being characterized by a high resistance to deformation in response to compression loading, and the other connecting arm body portion being characterized by a low resistance to elongation in response to tension loading.

12. A belt scraper assembly as defined in claim 7, in which the connecting arm is constructed of spring steel.

13. A belt scraper assembly as defined in claim 7, wherein the connecting arm is constructed of polyurethane.

14. A belt scraper assembly as defined in claim 7, wherein the scraper block is constructed of metal.

15. A belt scraper assembly as defined in claim 14, in which the metal comprises tungsten carbide.

16. A belt scraper assembly as defined in clam 7, in which the scraper block is constructed of polyurethane.

17. The belt scraper assembly of claim 7 wherein said scraper block is integrally attached to said connecting arm.

18. A conveyor belt scraper particularly adapted for use in cleaning a conveyor belt which can reverse its direction of movement, said belt scraper including a scraper block including an upper surface and first and second edge surfaces disposed at either side thereof, at least one resilient arm member supporting said scraper block, said arm adapted to be attached to a support member, a first side wall of said arm member which is relatively strong, a second side wall of said arm member which is directly opposed to said first side wall and relatively weak compared to said first side wall, a weakened zone formed in said second side wall which is adapted to allow flexing of said second side wall at said weakened zone in response to reversal of conveyor belt direction thereby changing the effective length of said second side wall relative to said first side wall and preventing damage to said conveyor belt.

19. The belt scraper of claim 18 wherein said first side wall has a first thickness and said second side wall has a second thickness which is thinner than said first thickness of said first side wall.

20. The belt scraper of claim 18 wherein said first side wall has a first cross-sectional area and said second side wall has a second cross-sectional area which is smaller than said first cross-sectional area of said first side wall.

21. The belt scraper of claim 18 wherein said first side wall has a first predetermined length and said second side wall has a second predetermined length which is longer than said first predetermined length of said first side wall.

22. The belt scraper of claim 18 wherein said scraper block is integrally attached to said connecting arm.

23. The belt scraper of claim 18 wherein said arm is constructed of an elastomeric material.

24. The belt scraper of claim 18 wherein said scraper block is constructed of an elastomeric material.

25. The belt scraper of claim 18 wherein said scraper block is constructed of metal.

26. The belt scraper of claim 18 including fulcrum means connectable to the support member, said fulcrum means having an edge portion disposed for engagement against one side of said arm thereby establishing a pivotal axis which is offset with respect to the support member and about which said scraper block turns in response to deflection of said connector arm toward said fulcrum means.

* * * * *

UNITED STATES PATENT AND TRADEMARK OFFICE
CERTIFICATE OF CORRECTION

PATENT NO. : 5,310,042
DATED : May 10, 1994
INVENTOR(S) : Willem D. Veenhof

It is certified that error appears in the above-identified patent and that said Letters Patent is hereby corrected as shown below:

Column 2, line 10, before the word "the" insert the word
-- to --.

Column 13, line 23, before the word "adapted" insert the word
-- assembly --.

Column 13, line 32, change the word "or" to -- of --.

Column 14, line 12, change the word "clam" to -- claim --.

Signed and Sealed this

Ninth Day of August, 1994

Attest:

BRUCE LEHMAN

Attesting Officer

Commissioner of Patents and Trademarks